May 13, 1958

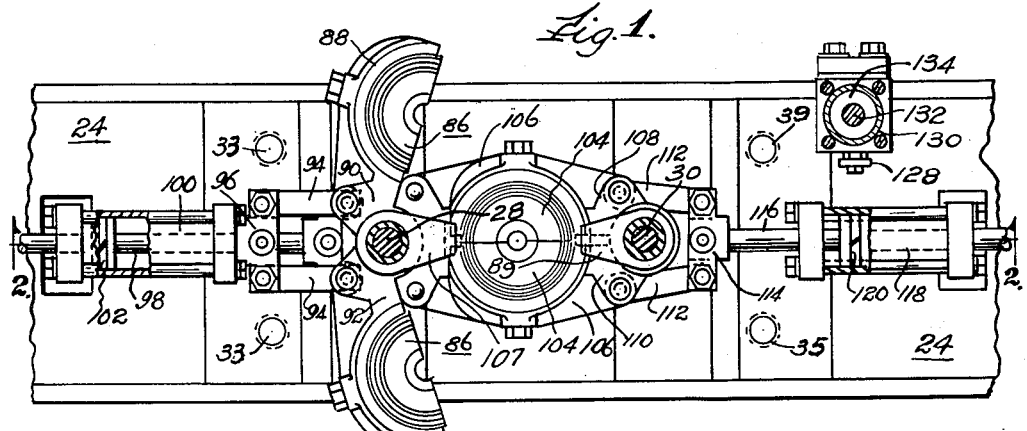

B. H. KOOB 2,834,154

CONTAINER MANUFACTURING MACHINE

Filed Nov. 8, 1954

INVENTOR,
Bernard H. Koob
BY
Bair, Freeman & Molinare
Attorney.

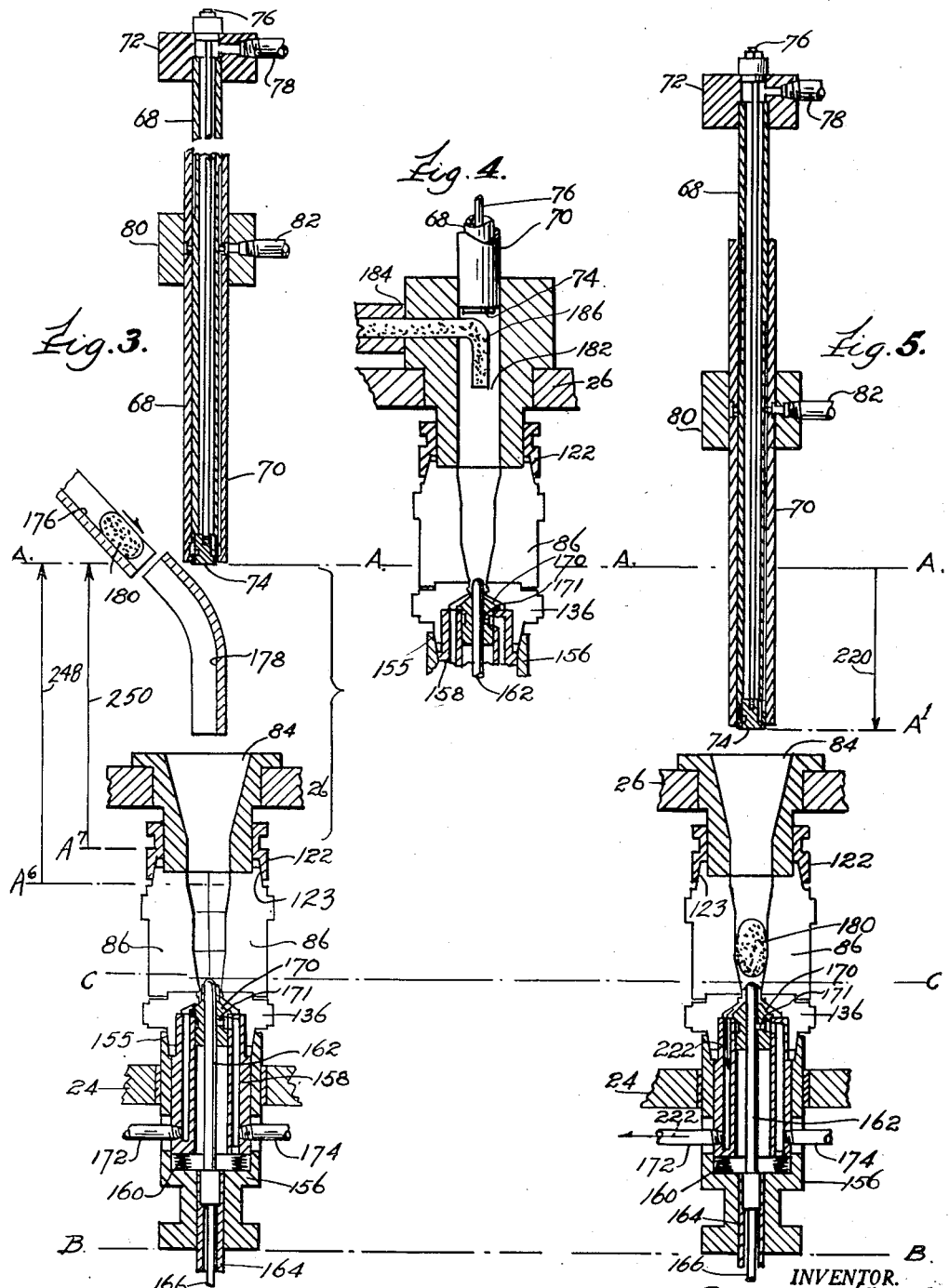

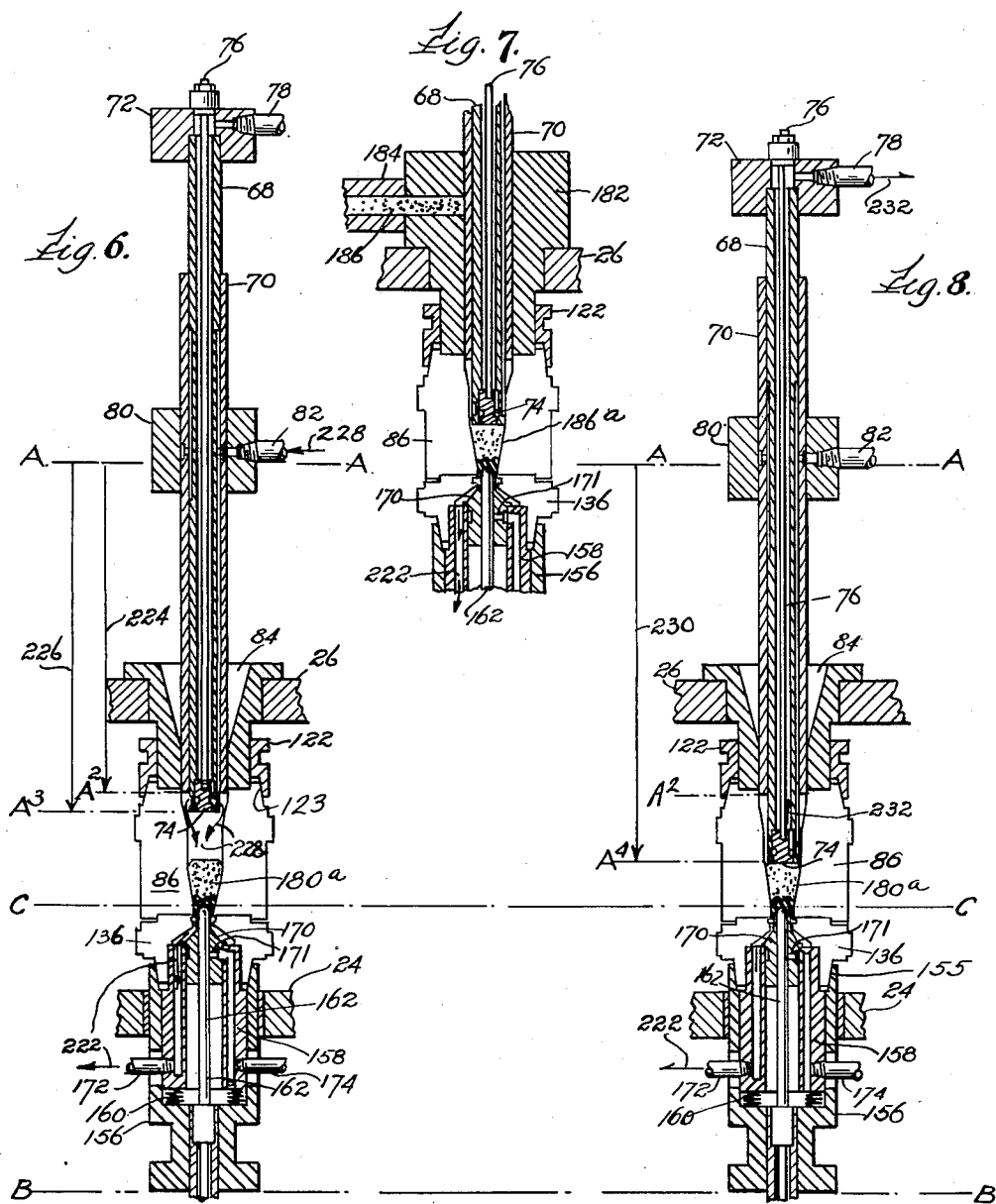

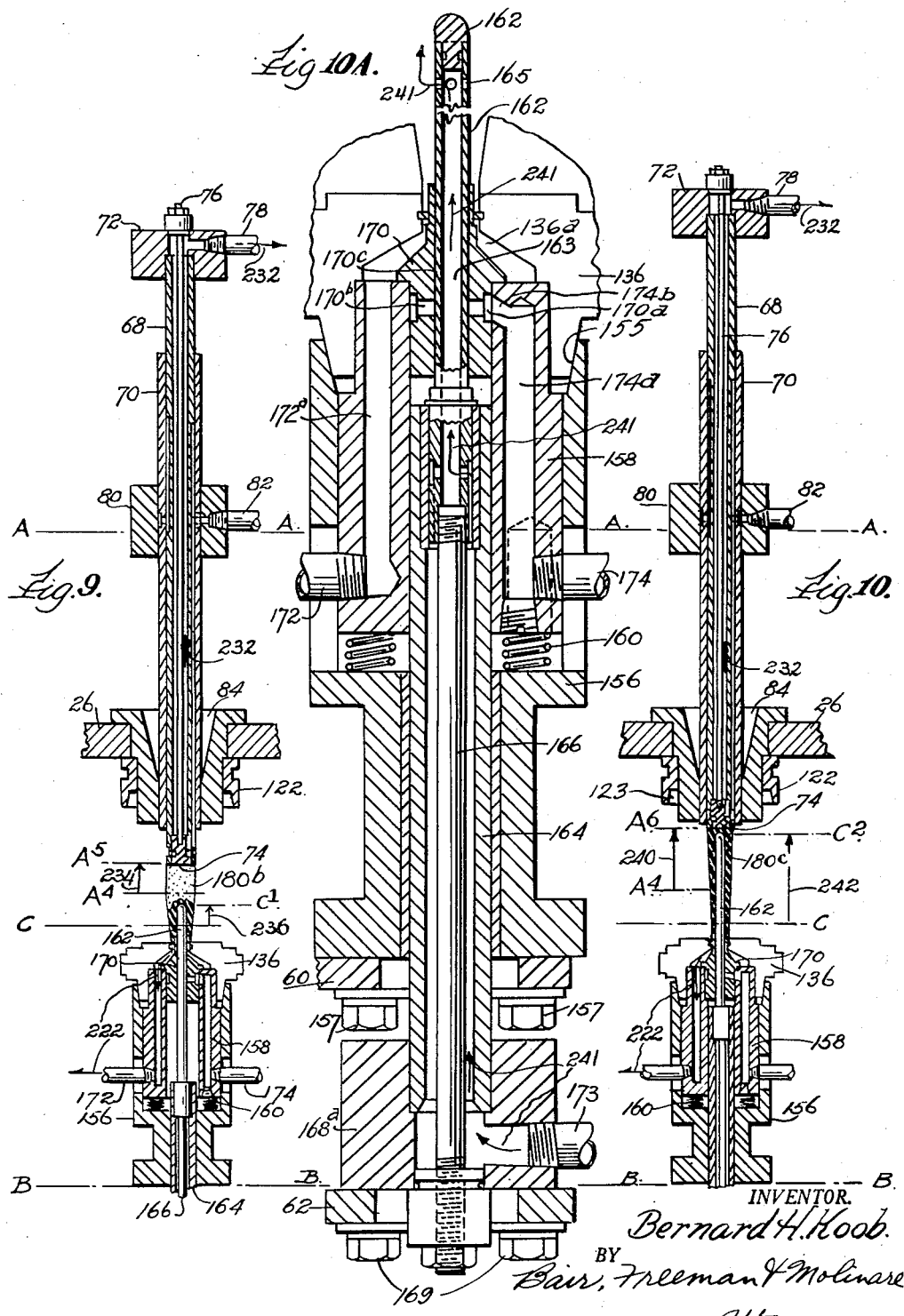

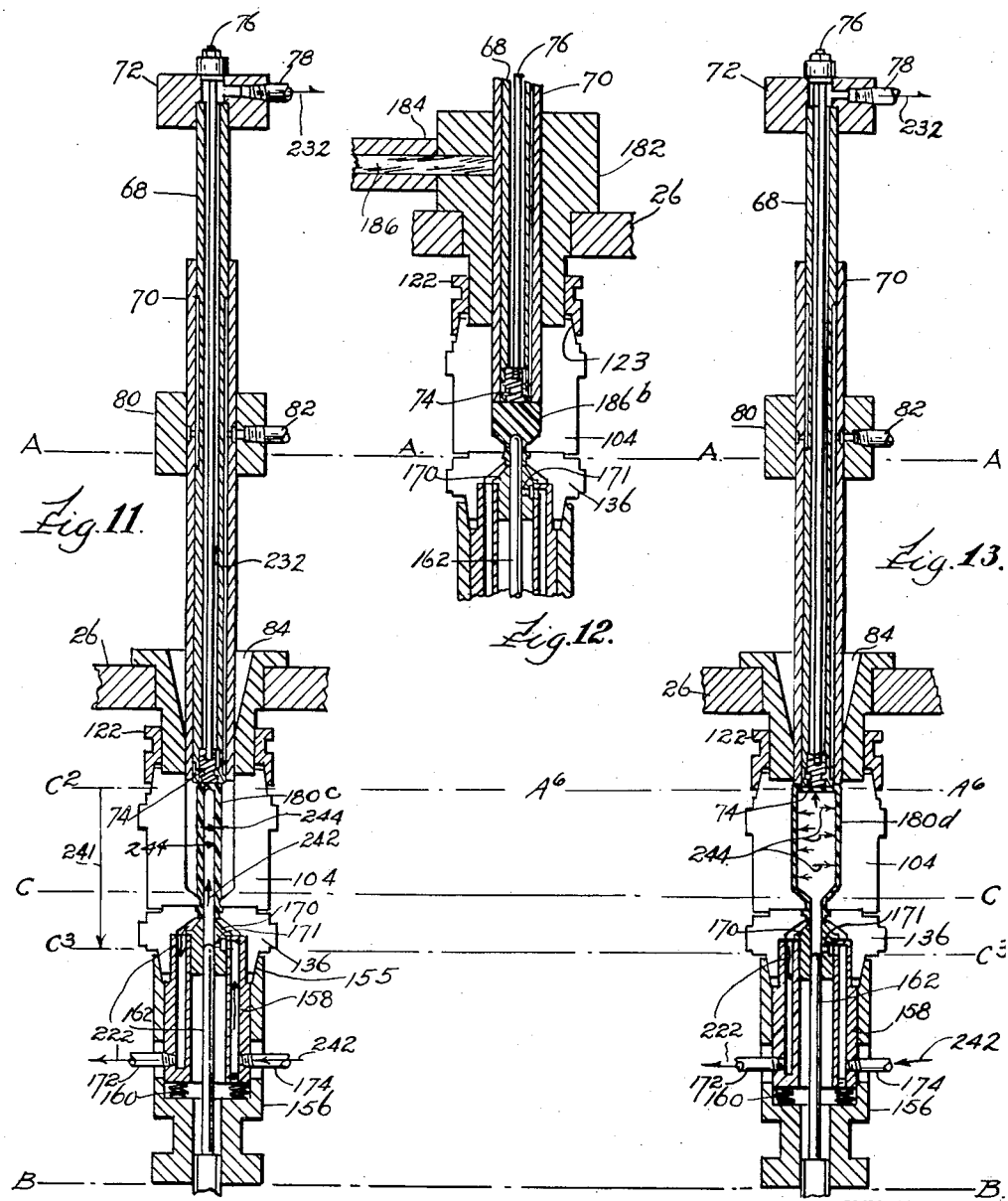

May 13, 1958     B. H. KOOB     2,834,154
CONTAINER MANUFACTURING MACHINE
Filed Nov. 8, 1954     7 Sheets-Sheet 7
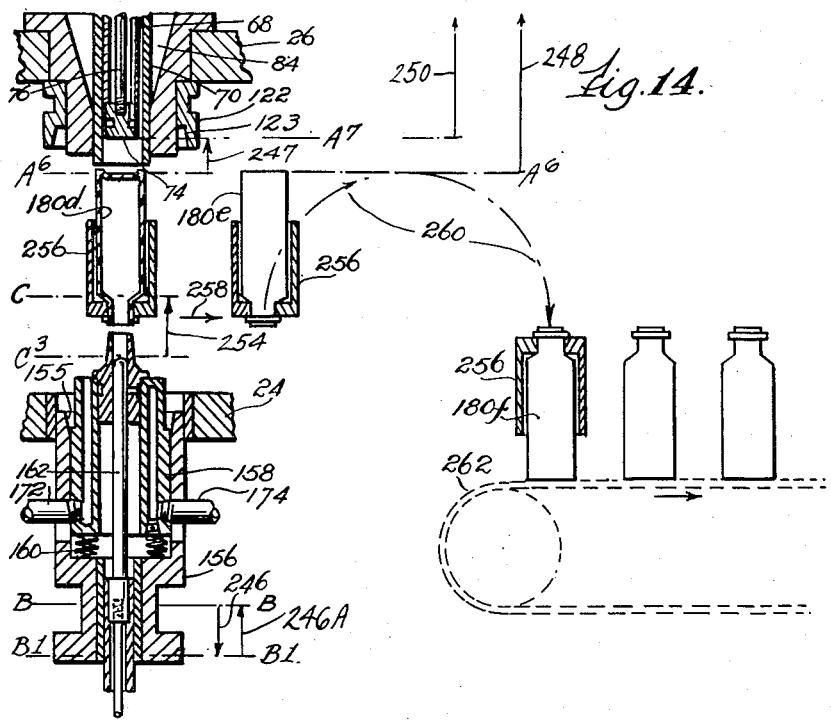
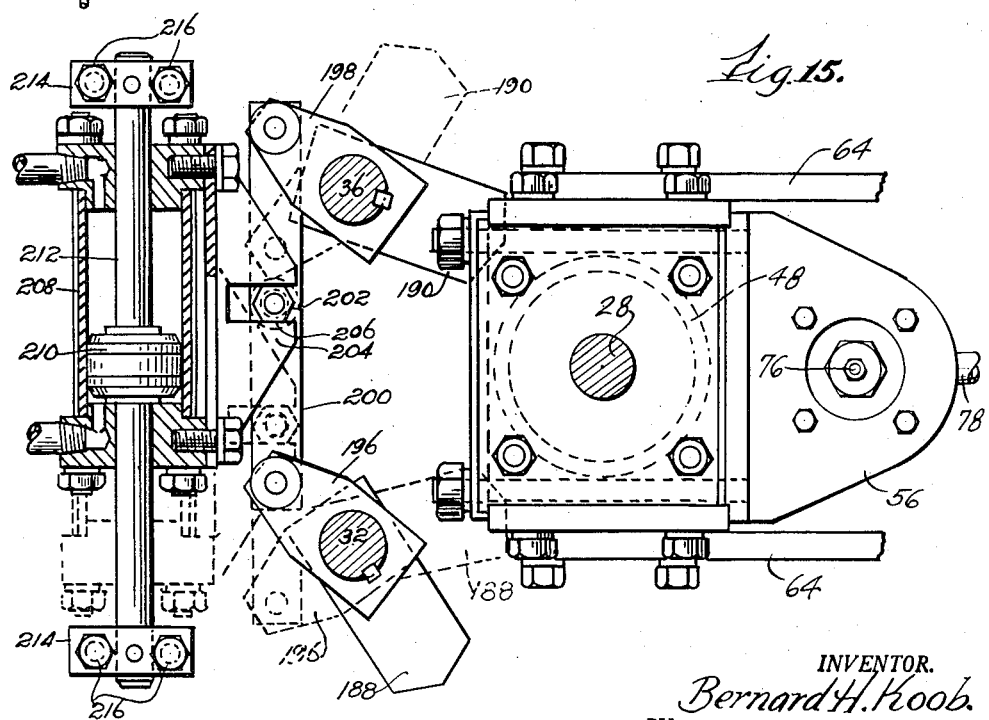
INVENTOR.
Bernard H. Koob.
BY
Bair, Freeman & Molinare
Attorneys.

United States Patent Office 2,834,154
Patented May 13, 1958

2,834,154

CONTAINER MANUFACTURING MACHINE

Bernard H. Koob, Anderson, Ind., assignor to Lynch Corporation, Anderson, Ind., a corporation of Indiana Application November 8, 1954, Serial No. 467,595

14 Claims. (Cl. 49—9)

This invention relates to a container manufacturing machine, i. e., one which manufactures containers of molten glass, plasticized material, or the like.

One object of the invention is to provide a machine of simple, durable and inexpensive construction having a minimum of parts operable by means of air cylinders and pistons with air supplied thereto from a suitable timer including cam operated air valves that directly supply air to the cylinders and thus eliminate the usual spool valves of present day glassware machines.

Another object is to provide a machine that does not require inversion of the parison but blows it in the inverted position and likewise forms the finished ware inverted in the ware mold by the use of a special finish plunger which rises through the neck of the parison and stretches it after a bottom forming plunger has contacted the bottom of the parison while in the inverted position and vacuum applied thereto, the parison mold being open during the upward movement of the finish plunger to permit reheating while the parison is being stretched by the finish plunger and thereafter the ware mold being brought into surrounding relation to the stretched parison.

Still another object is to provide a means for thereafter introducing an expansion medium such as compressed air into the stretched parison for expanding it to fit the ware mold, vacuum being applied to both the finish of the container and the bottom thereof during the expanding operation to evacuate the mold and insure full expansion of the ware thereinto under the influence of the expansion medium.

A further object is to provide an arrangement that can use $CO_2$ as the expansion medium for the purpose of aiding in the extraction of heat from the parison as it is being blown to final shape, and at the same time, taking advantage of the expansion of the $CO_2$ as it is heated by the parison for effecting the expansion operation.

Still a further object is to provide cylinder and piston arrangements for operating the finish plunger that enters the parison and the bottom forming plunger, as well as other mechanisms of the machine, in stepped relation controlled by movable stops that permit partial travel of the parts and thereafter further travel to another stopped position so that the machine can be adjusted for many different possibilities and a great variety of ware.

An additional object is to provide alternative methods of feeding plastic materials, where the plasticized materials are injected into a receiving chamber and severed by the descending bottom forming plunger, thus making the device particularly adapted for "plastic" bottles and containers of similar materials.

A further additional object is to provide a modification that eliminates the necessity of employing a parison mold when the plasticized material is fed into the upper end of a ware mold and settled into the container finish mold and shoulder of the ware mold by either air or the bottom forming plunger to form a parison, the parison then being stretched to the length of the final ware by the upward moving finish plunger that enters the neck of the ware which is thereafter expanded by the introduction of expansion air or $CO_2$.

Still a further additional object is to provide for tightly holding the molds closed by means of tapered "hoops" engageable therewith at top and bottom.

With these and other objects in view, my invention consists in the construction, arrangement and combination of the various parts of my container manufacturing machine, and in the method steps herein disclosed, whereby the objects above contemplated are attained, as hereinafter more fully set forth, pointed out in my claims and illustrated in detail on the accompanying drawing, wherein:

Fig. 1 is a horizontal sectional view, taken on the line 1—1 of Fig. 2A of a container manufacturing machine embodying my invention.

Fig. 2 is a vertical sectional view thereof on the line 2—2 of Fig. 1 showing the upper portion of the machine.

Fig. 3 is a partial sectional view of the machine showing the parts in the positions they assume just before a gob of material enters the parison mold.

Fig. 4 is a similar sectional view of a portion of Fig. 3 showing a modified construction with the operation at substantially the same stage as in Fig. 3.

Fig. 5 is a view similar to Fig. 3 showing the gob of material in the parison mold and ready to enter the container finish mold.

Fig. 6 is a view similar to Fig. 3 showing the container finish being formed.

Fig. 7 is a sectional view similar to Fig. 6 showing the modification of Fig. 4 with the operation at the same state as Fig. 6.

Fig. 8 is a sectional view similar to Fig. 3 showing the descent of a bottom forming plunger to contact the upper surface of the material in the parison mold.

Fig. 9 is a sectional view similar to Fig. 3 showing the parison mold removed and the bottom forming plunger stretching the parison vertically.

Fig. 10 is a sectional view similar to Fig. 9 showing further elongation of the parison.

Fig. 10A is an enlarged sectional view similar to the central portion of Fig. 2A but shows a modification thereof which permits introduction of additional air for expanding the parison at one stage in the operating cycle comparable to Fig. 10.

Fig. 11 is a sectional view similar to Fig. 3 showing the ware mold in place and the blowing operation commencing.

Fig. 12 is a sectional view similar to Fig. 11 showing a further modification over Figs. 4 and 7 wherein a ware mold only is used, the charge of material being directly introduced thereto and shows positions of the parts comparable to Fig. 11.

Fig. 13 is a sectional view similar to Fig. 11 showing the ware being blown to final shape.

Fig. 14 is a sectional view similar to Fig. 11 (except slightly enlarged) showing the finished ware being removed from the machine after the ware mold has opened and the ware being deposited on a conveyor or cooling plate; and Fig. 15 is a horizontal sectional view partially on the line 15—15 of Fig. 2 and partially on the line 15A—15A of Fig. 2A showing a cylinder stop operating mechanism.

Figure 2A:
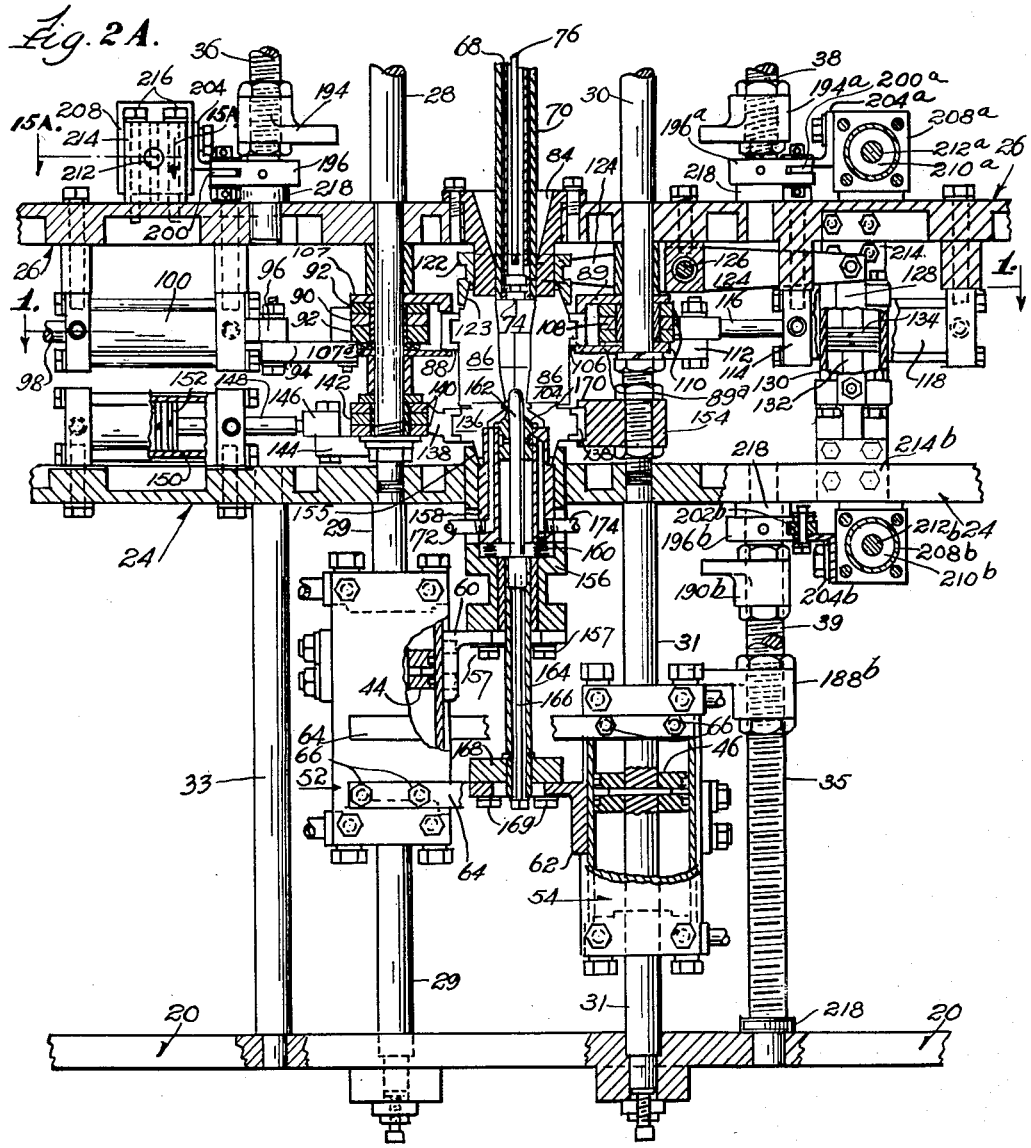
Fig. 2A is a continuation of the lower end of Fig. 2, Fig. 1 being taken on the line 1—1 thereof.

On the accompanying drawings I have used the reference numeral 20 to indicate a base plate and 22 a head plate. The ends of these plates may be suitably connected together by vertical frame members (not shown in the drawings, so as to conserve space) and such vertical members rigidly connect the base plate 20 and the head plate 22 in spaced relation to each other as illustrated in Figs. 2 and 2A. Also, these vertical frame memmbers support a lower table 24 and an upper table 26 as shown in Fig. 2A so that the vertical frame members and the plates 20, 22, 24, and 26 constitute a fixed framework for the various instrumentalities of my container manufacturing machine. A pair of rod-like posts 28 and 30 (see Fig. 2) also are provided as stationary parts of the framework of the machine. In Fig. 2A there are also stationary rod-like posts 29 and 31 aligned with the posts 28 and 30, respectively, and stationary posts 33.

Stop rods 32 and 34 have their lower ends oscillatably mounted in the upper table 26 and their upper ends oscillatably mounted in the head plate 22. Similarly, stop rods 36 and 38 have their lower and upper ends oscillatably mounted in the upper table 26 and the head plate 22 behind the stop rods 32 and 34 in Fig. 2. In Fig. 2A a stop rod 35 is shown and a stop rod 39 is located back of it.

Pistons 40 and 42 are secured to the posts 28 and 30, respectively, between the upper table 26 and the head plate 22. Similarly, between the base plate 20 and the lower table 24 pistons 44 and 46 are secured to the posts 29 and 31. Cylinders 48, 50, 52 and 54 receive the pistons 40, 42, 44, and 46, respectively, and are reciprocable relative thereto.

The cylinders 48, 50, 52, and 54 are provided with supporting brackets 56, 58, 60, and 62 for supporting certain equipment of the machines as will hereinafter be described in detail. To keep the cylinders 48 and 50 from rotating, each one is provided with a pair of bars 64 secured thereto by cap screws 66 and projecting to a position straddling the other cylinder and, likewise, a pair of bars 64 are secured by cap screws 66 to the cylinders 52 and 54 for the same purpose.

A bottom forming plunger 68 is carried by the bracket 56 and a bottom forming sleeve 70 is carried by the bracket 58 as will now be described.

The bottom forming plunger 68 is secured in an upper head 72 by means of a lower head 74 and a tie rod 76 extending through both heads, the upper head 72 being in turn secured to the bracket 56 as by cap screws 57. A bottom grip vacuum connection 78 is made to the upper head 72.

A head 80 for the bottom forming sleeve 70 is secured to the bracket 58 as by cap screws 59 and supports the bottom forming sleeve, a settle air connection being provided at 82 to the head 80. The bottom forming sleeve 70 is reciprocable into and out of a funnel 84.

A parison mold 86 is provided in the usual form of two halves which can be closed as in Fig. 2, or opened as in Fig. 1, in the usual manner. The parison mold halves are carried by mold carriers 88 which are of half circle formation and one of which is provided with a single arm 90 and the other with two arms 92 for pivoting them on the post 28. The arms 92 straddle the arm 90. Mounted on the post 30 are vertical aligners 89 and 89a for the mold carriers 88 when closed.

As shown in Fig. 1, a pair of links 94 are pivoted at one end to the arms 90 and 92 and at their other end to a cross-head 96 connected with a piston rod 98 that extends into a cylinder 100 and has therein a piston 102.

I provide a ware mold 104 also in the form of two halves which are carried by arcuate mold carriers 106, one of which has a single arm 108, and the other two arms 110 pivoted on the post 30 with the arms 110 straddling the arm 108. Links 112 have one end pivoted to the arms 108 and 110 and the other end pivoted to a cross-head 114 from which a piston rod 116 extends into a cylinder 118. A piston 120 is located in the cylinder and secured to the piston rod. Vertical aligners 107 and 107a are provided on the post 28 for the mold carriers 106 when closed.

A mold clamp ring 122 is provided for the parison and ware molds and is vertically slidable on the funnel 84. It is provided with a taper surface 123 and is adapted to be reciprocated relative to the funnel by means of a pair of rock arms 124 pivoted at 126 and connected by a link 128 to a cylinder 130. The cylinder is reciprocable relative to a stationary piston rod 132 and a piston 134 is secured to this rod for coaction with the cylinder. In the position of Fig. 2A the ring 122 tightly clamps the upper end of the mold in closed position with its halves properly aligned.

A container finish mold 136 is provided (see Fig. 2A), also in the form of two halves supported by a pair of arcuate mold carriers 138. A pair of arms 140 extend from one of the mold carriers 138 and a single arm 142 straddled by the arms 140 extends from the other mold carrier 138. The arms 140 and 142 are pivoted on the post 28.

A pair of links 144 have one end pivoted to the arms 140 and 142 and the other end pivoted to a cross-head 146 which is mounted on a piston rod 148. The piston rod extends into a cylinder 150 and a piston 152 is secured thereto within the cylinder. Opposite the arms 140 and 142 and mounted on the post 30 is a mold guide 154 having a notch to coact with the mold carriers 138 to support the finish mold 136 in its proper position when closed. The notch serves as a vertical aligner for the mold carriers 138.

A primary finish sleeve carrier 156 is secured to the bracket 60 by cap screws 157. A secondary finish sleeve carrier 158 is slidable therein and is normally biased upwardly by springs 160. The carrier 156 also serves as locking means for the finish mold 136, being tapered at 155 for this purpose. The locked position is shown in Fig. 2A. The taper 155 as well as the taper 123 on the ring 122 provide "hoop" means at bottom and top for holding the molds tightly closed.

A finish plunger 162 is supported on a tube 164 by means of a tie rod 166. The lower end of the tube 164 is secured in a base plate 168 which in turn is secured by cap screws 169 to the bracket 62. A finish sleeve 170 is mounted in the upper end of the secondary finish sleeve carrier 158 and the upper end of the finish plunger 162 is slidable therein.

A container finish vacuum connection 172 and a secondary expansion air connection 174 are made to the secondary finish sleeve carrier 158 and communicate with the finish mold 136 surrounding the finish sleeve 170 and the bore of the finish sleeve 170, respectively, as shown in Fig. 2A. Fig. 10A illustrates the vacuum and air passageways in clearer detail, vacuum passageway 172a leading to space 136a in the finish mold and air passageways 174a and 174b leading to an annular groove 170a and a cross hole 170b that communicates with a bore 170c for the finish plunger 162. When the finish plunger is retracted as in Figs. 11 and 13, secondary expansion air can flow from the cross hole 170b into the bore 170c for expanding the parison of Fig. 11 to the final size and shape of bottle of Fig. 13. The air connection 174 may be supplied with either compressed air or $CO_2$, as will hereinafter be referred to.

In Fig. 3, I show a trough 176 with a gob of material 180 descending therein to be deflected by a deflector 178 into the funnel 84. This material may be melted glass or material for forming a "plastic" bottle or container, the material being softened by heat or the like to a suitable consistency for being blown into the desired shape.

In Fig. 4, a modification is shown in the form of a receiver 182 substituted for the funnel 84 and having an extrusion nozzle 184 associated therewith for the plastic material shown at 186 which is in plastic condition as it is being extruded into the receiver 182. A gob of this material is shown at 186a in Fig. 7, which figure is also illustrative of the modification just referred to while a gob 186b thereof is shown in Fig. 12 illustrating the same modification but with the gob received in the ware mold 104 without first having been formed in the parison mold 86 as in Figs. 4 and 7. Figs. 4, 7 and 12 will be referred to in greater detail later on in my specification.

If desired, the finish plunger 162 may be provided with a bore 163 as shown in Fig. 10A having ports 165 to the exterior of the plunger adjacent its upper end. A modified base plate 168a is then provided with an expansion air connection 173 which may be termed a primary expansion air connection whereas when this connection is provided, the one at 174 then becomes a secondary expansion air connection.

Referring to Figs. 2 and 2A, upper stops 188 and 190 are adjustably secured on the stop rods 32 and 36, respectively, and lower stops 192 and 194 are adjustably secured, respectively thereto. Similarly, upper and lower stops 188a, 190a, 192a and 194a are provided on the stop rods 34 and 38 and upper stops 188b and 190b are provided on similar stop rods 35 and 39 located below the lower table 24 (see Fig. 2A).

As shown in Fig. 15, arms 196 and 198 are keyed to the stop rods 32 and 36 and their outer ends are connected together by a link 200 pivoted thereto. The link 200 carries a nut 202 coacting with a bracket 204 which is provided with a slot 206 in which the nut slides.

The bracket 204 is carried by a cylinder 208 within which is a piston 210. The piston is secured to a piston rod 212 which is stationarily mounted by means of brackets 214 secured to the upper table 26 by cap screws 216.

The parts 196 to 216 are duplicated at 196a to 216a for the stop rods 34 and 38 and at 196b to 216b for the stop rods 35 and 39, the brackets 214b being secured to the bottom of the lower table 24. The ends of all six stop rods are provided with ball type thrust bearings 218 to permit ready rocking of the stop rods when their stops are engaged by the cylinders 48, 50, 52 or 54 under the action of compressed air in the cylinders.

The arrangement just described permits adjustable operation of the cylinders 48, 50, 52 and 54 such that they can travel part of their stroke and be stopped, and then the stop removed and they can travel the rest of their stroke for certain types of operations, and for adjustment of the machine for blowing containers from either molten glass or heated plastic material. For instance, the cylinder 48 as shown in Fig. 2 has been stopped by the stop 190 and when this stop is rocked out of the way, as to the dotted position in Fig. 15, then the stop 188 is effective to stop the cylinder as it travels on upwardly. Similarly, in the downward direction the lower end of the cylinder can strike the stop 192 first if it is projected into the path of the cylinder and this stop can be removed and the stop 194 oscillated to the proper position for stopping the further downward motion of the cylinder 48 at its limit of movement determined by the position of the stop 194 on its stop rod 32.

Obviously, the usual valve timer for compressed air operated cylinders and pistons of a container manufacturing machine can supply air to opposite ends of the cylinder 208 for shifting the stops to the full or dotted line positions of Fig. 15 as desired at appropriate times as set by the timer cams to get any desired operation or sequence of operations for various materials used in the manufacture of containers in my machine. The timer also supplies vacuum and air at the proper time for the vacuum connection 78, the settle air connection 82, the container finish vacuum connection 172 and the primary and secondary expansion air connections 173 and 174.

The downward movement of the cylinder 54 is stopped by the upper end of the cylinder striking the piston 46 therein. As to the cylinder 52, it is limited both in the upward and downward directions by the ends of the cylinder striking the faces of the piston 44 as the upward and downward movements of the primary and secondary finish sleeve carriers 156 and 158 need not be made adjustable.

*Practical operation*

In the operation of my container manufacturing machine, the initial position of the parts are as shown in Fig. 3 at the time the gob 180 is fed. This can be considered the beginning of the operating cycle. Both the bottom forming plunger (elements 68 and 74) and the bottom forming sleeve 70 are in raised position, indicated by a dot and dash reference line A that extends all the way across Figs. 3, 5, 6, 8, 9, 10, 11 and 13 and located at the lower ends of the plunger 68—74 and sleeve 70 in Fig. 3. Similarly, there is a reference line B extending across the figures just enumerated and Fig. 14 and located at the lower end of the primary finish sleeve carrier 156 in Fig. 3 and a reference line C extending across said figures and located at the top of the finish plunger 162 in Fig. 3. The reference lines A, B and C are provided to aid in the description of the cycle of operations shown in these figures which will now be referred to.

In Fig. 3, the primary finish sleeve carrier 156 is in the raised position serving to clamp the finish mold 136 closed (this mold and the parison mold 86 having been closed by proper operation of their respective cylinders 150 and 100). The finish sleeve is in its proper container finish forming position determined by the secondary finish sleeve carrier 158 having engaged a shoulder in the finish mold under the action of the springs 160 and the upward motion of the primary sleeve carrier 156 by proper operation of its cylinder 52 as limited by the primary finish sleeve carrier 156 at its upper end engaging with the taper fit on the finish mold. The finish plunger 162 is stopped in the position shown (and indicated by the line C) by its cylinder 54 having engaged the stop 188b (48 and 50 having engaged the stops 188 and 188a). Both the finish plunger and the finish sleeve are in the proper position for forming the finish of the container to be molded.

In Fig. 5 the bottom forming plunger and sleeve have moved to A¹ as indicated by the arrow 220 by the time the gob 180 has reached the finish plunger 162. At this particular moment the timer causes the finish vacuum to be pulled in the connection 172 as indicated by the arrows 222 and the plunger 68—74 and the sleeve 70 are descending.

In Fig. 6 the bottom forming sleeve 70 has descended as indicated by the arrow 224 to the line A² where its cylinder 50 has been stopped by the stop 192a (this being the position shown in Fig. 2) but the bottom forming plunger 68—74 is still descending as indicated by the reference line A³ and the arrow 226. This permits the bottom forming plunger to extend sufficiently from the bottom forming sleeve that the annular groove around the outside of the bottom forming plunger adjacent its lower end is out of the bottom forming sleeve and can therefore discharge settle air, as indicated by the arrows 228, which at this time is supplied by the timer to the settle air connection 82. This settles the gob around the finish plunger and finish sleeve acting in conjunction with the finish vacuum still being applied, as indicated by the arrows 222. Stoppage of the bottom forming sleeve 70 at A² determines the overall length of the container to be formed of the gob 180a. Settle air compacts the material into the finish mold 136 and shoulder of parison mold 86.

Referring to Fig. 8, the supply of settle air has been discontinued and vacuum has been applied by the timer to the bottom grip vacuum connection 78 so that a vacuum is pulled, as indicated by the arrows 232, around the lower head 74 of the bottom forming plunger 68 and upwardly through this plunger around the tie rod 76, the vacuum being thus applied to the top of the parison 180a and the bottom forming plunger having descended to contact the upper surface of the parison. The parison is held by the vacuum at both of its ends (arrows 222 and 232), the descent of 68—74 being illustrated at A⁴ by the arrow 230 and stopped at A⁴ by the cylinder 50 engaging the stop 194a, 192a having been removed from stopping position.

In Fig. 9 the cycle is continued after the clamp ring 122 is raised and the parison mold 86 opened with the finish vacuum still applied at 222 and the bottom grip vacuum still applied at 232, while at the same time the bottom forming plunger 68—74 has risen from $A^4$ to $A^5$ as indicated by the arrow 234 and the finish plunger 162 has risen from C to $C^1$ as indicated by the arrow 232 by the proper supply of air to the cylinders 48 and 54 respectively. The ascending bottom forming plunger 68—74 stretches the parison vertically and simultaneously the finish plunger 162 is pressing upwardly, moving relative to the finish sleeve 170 to form a cavity in the center of the parison. The opening of the parison mold 86 permits the parison to "reheat" or the inherent heat thereof to be distributed throughout the parison to soften the skin that was formed on the exterior surface by the parison mold while the finish mold 136 remains closed to maintain the finish on the parison which is indicated as 180b in this figure.

Figure 10 illustrates further stretching of the parison, the bottom forming plunger 68—74 having risen as indicated by the arrow 240 to the position $A^6$ where it is stopped by its cylinder 48 engaging the stop 190 which is the position shown in Fig. 2, this being the proper relation of the bottom forming plunger to the bottom forming sleeve to form the bottom of the container. The finish plunger 162 finishes its upward stroke, the limit of which is determined by its cylinder 54 engaging the stop 190b (arrow 242—ending at $C^2$) the parison being indicated 180c. The vacuum at both ends of the parison continues as indicated by the arrows 222 and 232.

In Fig. 11 the vacuum still continues (222 and 232) and the ware mold 104 has been closed by proper operation of its cylinder 180. The clamp ring 122 has been lowered on ware mold by its cylinder 130. Simultaneously therewith, the finish plunger 162 is withdrawn from position $C^2$ to position $C^3$ as indicated by the arrow 241 and stops at $C^3$ by reason of the upper head of its cylinder 54 engaging the top surface of the piston 46 therein. The finish plunger is now far enough down in the finish sleeve 170 to open a port 171 thereof and expansion medium (air or $CO_2$) is supplied to the expansion air connection 174 as indicated by the arrows 242 which expansion medium enters the parison 180c and starts to expand it horizontally as indicated by the arrows 244 into the ware mold. At the same time, the vacuum continues at both ends of the parison as indicated by the arrows 222 and 232.

If desired, the expansion medium may be introduced earlier than the Fig. 11 position, such as in the Fig. 10 position through the hollow (163) plunger 162 shown in Fig. 10A, before the plunger starts down, or any time during its downward travel. This insures expansion of the container forming material away from the plunger to permit its downward movement more readily and the expansion medium utilizes the time of downward travel to cool the parison. Also, the discharge openings 165 cause the medium to effect a progressive wiping and cooling action on the parison starting at the bottom thereof which it is desirable to "set" first.

In Fig. 13, all parts remain as they were in Fig. 11 and the expansion medium continues to flow as indicated by the arrows 244 which expands the parison to fill the ware mold as indicated at 180d, this being the final shape of the container being blown. The formation of the container is completed with vacuum at both ends continuing until the ware is stable enough for removal from mold.

Referring to Fig. 14, the flow of the expansion medium has been stopped by the timer, the finish vacuum has stopped, the bottom grip vacuum has stopped, the ware mold and finish mold have been opened after the clamp ring 122 has been raised, the finish sleeve carriers 156 and 158 have been lowered from B to $B^1$ as indicated by the arrow 246, and the bottom forming plunger 68—74 has been raised from $A^6$ to $A^7$ (arrow 247).

Take-out tongs 256 have been engaged with the finished container 180d whereupon they are moved in the direction of the arrow 258 to the position 180e and then swung over as indicated by the arrow 260 to the position 180f on a conveyor or cooling plate 262. In the case of glassware 262 would be a conveyor for delivering the ware to the annealing lehr, whereas in the manufacture of plastic bottles 262 would be a perforated conveyor with cooling air delivered therethrough for cooling the ware.

Next the bottom forming plunger 68—74 and the bottom forming sleeve 70 are returned from positions $A^6$ and $A^7$ to position A in Fig. 3 as indicated by the arrows 248 and 250 respectively to ready the machine for the next operation.

When using the construction shown in Fig. 10A, primary expansion air is introduced, as indicated by the arrows 241, at the connection 173 at about the time the finish plunger 162 is at its upper limit of motion (same position as in Fig. 10). This provides expansion air at the upper end of the inverted parison 180c (Fig. 10) to more effectively and quickly expand it than possible with only the expansion air that was described in connection with Fig. 11.

In the alternative method of feeding plastic materials, as shown in Figs. 4 and 7, the plasticized material 186 is injected through the nozzle 184 into the receiver 182, as shown in Fig. 4, and the extrusion is controlled so that a predetermined quantity is so injected. This quantity is then sheared off by the descending bottom forming sleeve 70 and the gob of material 186a as shown in Fig. 7 thereupon drops into the parison mold 86 the same as the gob 180a in Fig. 6 and is drawn thereinto by the vacuum applied (arrow 222) while the bottom forming plunger and the bottom forming sleeve are moved downwardly the same as in Figs. 6 and 8 and the plunger compacts the material into the mold as illustrated in Fig. 7. Thereafter the same steps occur as described in connection with Figs. 9, 10, 11, 13, and 14.

The container forming technique illustrated employs a parison mold and air settle for parison formation (Figs. 3 to 14). An alternative formation would use the bottom forming plunger to settle press the material into the finish mold without prior air settle and this is illustrated in Figs. 4 and 7.

Another alternative method eliminates the parison mold altogether, the plasticized material from the extruded position of Fig. 4 being sheared off and dropped directly into the upper end of the ware mold 104 as shown in Fig. 12 and settled into the finish mold 136 and shoulder of the ware mold by either air or the bottom forming plunger 68—74 in conjunction with the sleeve 70 as illustrated to form the parison indicated at 186b. This parison is then stretched to the length of the final ware by upward movements of the bottom forming plunger, the bottom forming sleeve and the finish plunger, and is expanded as illustrated in Figs. 11 and 13 to fill the ware mold. Thus, with certain types of materials the manufacturing time is reduced and the use of parison molds eliminated, making it possible to manufacture containers more economically than the usual methods.

The modification shown in Fig. 12 eliminates the parison mold now used in the automatic manufacture of all glass containers before they are blown to their final shape. Where the design of the ware would permit the use of this method, manufacturing costs can be reduced and the value of the machine thereby enhanced.

From the foregoing specification it is believed obvious that I have provided a container manufacturing machine which accomplishes the objects contemplated and has improved operating characteristics with respect to machines now known. My machine is comparatively simple and its operation likewise simplified when compared with present-day machines.

I have referred to "expansion medium" introduced at 174 and indicated by arrows 241 and 242. $CO_2$ or liquid air when used for this purpose has many advantages over compressed air. A metered amount (much less than compressed air) may be admitted and due to its greater heat absorbing characteristic than compressed air will produce the desired expansion of the container forming material to fill the mold due to its own expansion as a result of absorbing heat. This shortens the expansion cycle and thereby permits a substantial increase in production from the machine.

Some changes may be made in the construction and arrangement of my container manufacturing machine and the steps of my method of manufacturing containers can be varied without departing from the real spirit and purpose of my invention, and it is my intention to cover by my claims any modified forms of structure, use of mechanical equivalents or use of equivalent method steps which may reasonably be included within their scope.

I claim as my invention:

1. In a container manufacturing machine of the character disclosed, an inverted mold, a finish mold associated therewith, a finish sleeve and a finish plunger projecting upwardly into said finish mold, a bottom forming plunger and a bottom forming sleeve movable downwardly into said inverted mold to plug it, said inverted mold being openable relative to said finish mold, and means for sequentially closing said finish mold around said finish sleeve and said finish plunger, closing said inverted mold about said finish mold, drawing a vacuum in said inverted mold around said finish sleeve after a charge of container forming material enters said inverted mold, entering said bottom forming sleeve and said bottom forming plunger into said inverted mold and further moving said bottom forming plunger into contact with the charge in said inverted mold, drawing a vacuum at said bottom forming plunger, simultaneously moving said finish plunger and said bottom forming plunger upwardly to stretch the parison and form the interior thereof hollow, retracting said finish plunger, introducing expansion medium into the cavity of the parison left thereby to expand the parison to fill said inverted mold, releasing the application of vacuum around said finish sleeve and at said bottom forming plunger, opening said inverted mold, retracting said finish sleeve and said bottom forming plunger to permit removal of the finished ware, and retracting said bottom forming sleeve.

2. In a container manufacturing machine of the character disclosed, an inverted parison mold, a finish mold associated therewith, a finish sleeve and a finish plunger projecting upwardly into said finish mold, a bottom forming plunger and a bottom forming sleeve movable downwardly into said parison mold to plug it, said parison mold being openable relative to said finish mold, a ware mold closable relative to said finish mold, and means for sequentially closing said finish mold around said finish sleeve and said finish plunger, closing said parison mold about said finish mold, drawing a vacuum in said parison mold around said finish sleeve after a charge of container forming material enters said parison mold, entering said bottom forming sleeve and said bottom forming plunger into said parison mold and further moving said bottom forming plunger into contact with the charge in said parison mold, drawing a vacuum at said bottom forming plunger, opening said parison mold, simultaneously moving said finish plunger and said bottom forming plunger upwardly to stretch the parison and form the interior thereof hollow, closing said ware mold around the parison, drawing a vacuum therein surrounding the parison, retracting said finish plunger, introducing expansion medium into the cavity of the parison left thereby to expand the parison to fill said ware mold, releasing the application of vacuum around said finish sleeve, surrounding the parison and at said bottom forming plunger, opening said ware mold, retracting said finish sleeve and said bottom forming plunger to permit removal of the finished ware, and retracting said bottom forming sleeve.

3. In a container manufacturing machine of the character disclosed, an inverted parison mold, a finish mold associated therewith, a finish sleeve and a finish plunger projecting upwardly into said finish mold, a bottom forming plunger and a bottom forming sleeve movable downwardly into said parison mold to plug it, said parison mold being openable relative to said finish mold, a ware mold closable relative to said finish mold, and means for sequentially closing said finish mold around said finish sleeve and said finish plunger, closing said parison mold about said finish mold, charging said parison mold with a charge of material, entering said bottom forming sleeve and said bottom forming plunger into said parison mold and further moving said bottom forming plunger into contact with the charge in said parison mold, drawing a vacuum at said bottom forming plunger, opening said parison mold, simultaneously moving said finish plunger and said bottom forming plunger upwardly to stretch the parison and form the interior thereof hollow, closing said ware mold around the parison, retracting said finish plunger, introducing expansion medium into the cavity of the parison left thereby to expand the parison to fill said ware mold, releasing the application of vacuum at said bottom forming plunger, opening said ware mold, retracting said finish sleeve and said bottom forming plunger to permit removal of the finished ware, and retracting said bottom forming sleeve.

4. A container manufacturing machine comprising an inverted parison mold, a finish mold associated therewith, a finish sleeve and a finish plunger projecting upwardly into said finish mold, a bottom forming plunger and a bottom forming sleeve movable downwardly into said parison mold to plug it, said parison mold being openable relative to said finish mold, said finish mold also being openable, a ware mold closable relative to said finish mold, and means for sequentially closing said finish mold around said finish sleeve and said finish plunger, closing said parison mold about said finish mold, drawing a vacuum in said parison mold around said finish sleeve after a charge of container forming material enters said parison mold, entering said bottom forming sleeve and said bottom forming plunger into said parison mold and further moving said bottom forming plunger into contact with the charge in said parison mold, drawing a vacuum at said bottom forming plunger, opening said parison mold, simultaneously moving said finish plunger and said bottom forming plunger upwardly to stretch the parison and form the interior thereof hollow, closing said ware mold around the parison, retracting said finish plunger, introducing expansion medium into the cavity of the parison left thereby and applying vacuum within said ware mold to expand the parison to fill said ware mold, releasing the application of vacuum around said finish sleeve and at said bottom forming plunger, opening said ware mold, retracting said finish sleeve and said bottom forming plunger to permit removal of the finished ware, and retracting said bottom forming sleeve.

5. A container manufacturing machine comprising an inverted parison mold, a finish mold associated therewith, a finish sleeve and a finish plunger projecting upwardly into said finish mold, a cylinder to which plasticized material may be introduced, said cylinder leading to said parison mold, a bottom forming plunger and a bottom forming sleeve movable in said cylinder, said bottom forming plunger and said bottom forming sleeve being movable therein to shear off a charge of such material for entry into said parison mold, said bottom forming plunger and said bottom forming sleeve being further movable into said parison mold to plug it, said parison mold being openable relative to said finish mold, a ware mold closable relative to said finish mold, and means for sequentially closing said finish mold around said finish sleeve and said finish plunger, closing said parison mold about said finish mold, moving said bottom forming plunger and said bottom forming sleeve in said cylinder to shear off a charge of material, drawing a vacuum in said parison mold around said finish sleeve after the material enters the parison mold, further moving said bottom forming plunger and said bottom forming sleeve downwardly into the parison mold and still further moving said bottom forming plunger into contact with the change in said parison mold, drawing a vacuum at said bottom forming plunger, opening said parison mold, simultaneously moving said finish plunger and said bottom forming plunger upwardly to stretch the parison and form the interior thereof hollow, closing said ware mold around the parison, retracting said finish plunger, introducing expansion medium in the cavity of the parison left thereby to expand the parison to fill said ware mold, releasing the application of vacuum around said finish sleeve and at said bottom forming plunger, opening said ware mold, retracting said finish sleeve and said bottom forming plunger to permit removal of the finished ware, and retracting said bottom forming sleeve.

6. A container manufacturing machine comprising an inverted parison mold, a finish mold associated therewith, a finish sleeve and a finish plunger projecting upwardly into said finish mold, a cylinder to which plasticized material may be introduced, said cylinder leading to said parison mold, a bottom forming plunger and a bottom forming sleeve movable in said cylinder, said bottom forming plunger and bottom forming sleeve being movable therein to shear off a charge of such material for entry into said parison mold, said bottom forming plunger and said bottom forming sleeve being further movable into said parison mold to plug it, said parison mold being openable relative to said finish mold, a ware mold closable relative to said finish mold, and means for sequentially closing said finish mold around said finish sleeve and said finish plunger, closing said parison mold about said finish mold, moving said bottom forming plunger and said bottom forming sleeve in said cylinder to shear off a charge of material, further moving said bottom forming plunger and said bottom forming sleeve downwardly into the parison mold and still further moving said bottom forming plunger into contact with the charge in said parison mold, drawing a vacuum at said bottom forming plunger, opening said parison mold, simultaneously moving said finish plunger and said bottom forming plunger upwardly to stretch the parison and form the interior thereof hollow, closing said ware mold around the parison, retracting said finish plunger, introducing expansion medium in the cavity of the parison left thereby to expand the parison to fill said ware mold, releasing the application of vacuum at said bottom forming plunger, opening said ware mold, retracting said finish sleeve and said bottom forming plunger to permit removal of the finished ware and retracting said bottom forming sleeve.

7. In a container manufacturing machine, an inverted ware mold, a finish mold associated therewith, a finish sleeve and a finish plunger projecting upwardly into said finish mold, a cylinder leading to said ware mold, a bottom forming plunger and a bottom forming sleeve movable therein, means for introducing plasticized material into said cylinder through the side thereof, said ware and finish molds being openable, and means for sequentially closing said finish mold around said finish sleeve and said finish plunger, closing said ware mold around said finish mold, drawing a vacuum in said ware mold around said finish sleeve after moving said bottom forming sleeve along said cylinder to shear a charge of material for entry into said ware mold, moving said bottom forming plunger and said bottom forming sleeve into said ware mold and into contact with the material there- in to settle it in said ware mold, drawing a vacuum at said bottom forming plunger, simultaneously moving said finish plunger and said bottom forming plunger upwardly to stretch the material and form the interior thereof hollow, retracting said finish plunger, introducing expansion medium in the cavity of the material left thereby to expand the material to fill said ware mold around the parison, releasing the application of vacuum around said finish sleeve and at said bottom forming plunger, opening said ware mold, retracting said finish sleeve and said bottom forming plunger to permit removal of the finished ware, and retracting said bottom forming sleeve.

8. A container manufacturing machine of the character disclosed comprising an inverted ware mold, a finish mold associated therewith, a finish sleeve and a finish plunger projecting upwardly into said finish mold, a cylinder leading to said ware mold, a bottom forming plunger and a bottom forming sleeve movable therein, means for introducing plasticized material into said cylinder through the side thereof, said ware mold and finish mold being openable, and means for sequentially closing said finish mold around said finish sleeve and said finish plunger, closing said ware mold around said finish mold, moving said bottom forming sleeve along said cylinder to shear a charge of material for entry into said ware mold, moving said bottom forming plunger and further moving said bottom forming sleeve into said ware mold to plug it and into contact with the material therein to settle it in said ware mold, drawing a vacuum at said bottom forming plunger, simultaneously moving said finish plunger and said bottom forming plunger upwardly to stretch the material and form the interior thereof hollow, retracting said finish plunger, introducing expansion medium in the cavity of the material left thereby to expand the material to fill said ware mold, releasing the application of vacuum at said bottom forming plunger, opening said ware mold, retracting said finish sleeve and said bottom forming plunger to permit removal of the finished ware, and retracting said bottom forming sleeve.

9. In a container manufacturing machine of the character disclosed, an inverted mold, a finish mold associated therewith, a finish sleeve and a finish plunger projecting upwardly into said finish mold, said finish plunger being hollow and having discharge openings adjacent its upper end, a bottom forming plunger and a bottom forming sleeve movable downwardly into said inverted mold to plug it, said inverted mold being openable relative to said finish mold, and means for sequentially closing said finish mold around said finish sleeve and said finish plunger, closing said inverted mold about said finish mold, drawing a vacuum in said finish mold around said finish sleeve after a charge of container forming material enters said inverted mold, entering said bottom forming sleeve and said bottom forming plunger into said inverted mold and further moving said bottom forming plunger into contact with the charge in said inverted mold, drawing a vacuum at said bottom forming plunger, simultaneously moving said finish plunger and said bottom forming plunger upwardly to stretch the parison and form the interior thereof hollow, retracting said finish plunger, introducing expansion medium into said finish plunger to enter the parison and expand it to fill said inverted mold, releasing the application of vacuum around said finish sleeve and at said bottom forming plunger, opening said inverted mold, retracting said finish sleeve and said bottom forming plunger to permit removal of the finished ware, and retracting said bottom forming sleeve.

10. In a container manufacturing machine of the character disclosed, an inverted mold, a finish mold associated therewith, a finish sleeve and a finish plunger projecting upwardly into said finish mold, said finish plunger being hollow and having discharge openings adjacent its upper end, a bottom forming plunger and a bottom forming sleeve movable downwardly into said inverted mold, said inverted mold being openable relative to said finish mold, and means for sequentially closing said finish mold around said finish sleeve and said finish plunger, closing said inverted mold about said finish mold, supplying a charge of container forming material to said mold, drawing a vacuum in said finish mold around said finish sleeve, entering said bottom forming sleeve and said bottom forming plunger into said inverted mold and further moving said bottom forming plunger into contact with the charge in said inverted mold, drawing a vacuum at said bottom forming plunger, simultaneously moving said finish plunger and said bottom forming plunger upwardly to stretch the parison and form the interior thereof hollow, introducing expansion medium into said finish plunger to be discharged therefrom and enter the parison to expand it to fill said inverted mold, releasing the application of vacuum around said finish sleeve and at said bottom forming plunger, opening said inverted mold, retracting said finish sleeve, said bottom forming plunger and said finish plunger to permit removal of the finished ware, and retracting said bottom forming sleeve.

11. In a container manufacturing machine, an inverted mold, a finish mold associated therewith, a finish plunger projecting upwardly into said finish mold, said finish plunger being hollow and having discharge openings adjacent its upper end, a bottom forming plunger movable downwardly into said inverted mold, said inverted mold being openable relative to said finish mold, and means for sequentially closing said finish mold around said finish plunger, closing said inverted mold about said finish mold, drawing a vacuum in said finish mold around said finish plunger after a charge of container forming material enters said mold, entering said bottom forming plunger into said inverted mold and into contact with the charge therein, drawing a vacuum at said bottom forming plunger, simultaneously moving said finish plunger and said bottom forming plunger upwardly to stretch the parison and form the interior thereof hollow, introducing expansion medium into said finish plunger to enter the parison and expand it to fill said mold, releasing the vacuum at said bottom forming plunger, opening said inverted mold, retracting said finish plunger while continuing to introduce the expansion medium, stopping the introduction of expansion medium, and retracting said bottom forming plunger.

12. In a container manufacturing machine of the character disclosed, an inverted parison mold, a finish mold associated therewith and surrounding the same, a finish sleeve and a finish plunger projecting upwardly into said finish mold, clamp rings for said parison and finish molds having tapered surfaces engageable therewith to hold the molds closed, a bottom forming plunger and a bottom forming sleeve movable downwardly into said parison mold to plug it, said parison mold being openable relative to said finish mold, a ware mold closable relative to said finish mold, one of said clamp rings being also associatable with said ware mold, said ware mold having a tapered surface engageable therewith, and means for sequentially closing said finish mold around said finish sleeve and said finish plunger, closing said parison mold about said finish mold, moving said clamp rings onto said parison mold and said finish mold, drawing a vacuum in said parison mold around said finish sleeve after a charge of container forming material enters said parison mold, entering said bottom forming sleeve and said bottom forming plunger into said parison mold and further moving said bottom forming plunger into contact with the charge in said parison mold, drawing a vacuum at said bottom forming plunger, moving said one of said clamp rings out of engagement with said parison mold, opening said parison mold, simultaneously moving said finish plunger and said bottom forming plunger upwardly to stretch the parison and form the interior thereof hollow, closing said ware mold around the parison, moving said one of said clamp rings into engagement therewith, drawing a vacuum in said ware mold surrounding the parison, retracting said finish plunger, introducing expansion medium into the cavity of the parison left thereby to expand the parison to fill said ware mold, releasing the application of vacuum around said finish sleeve, surrounding the parison and at said bottom forming plunger, opening said ware mold, retracting said finish sleeve, said bottom forming plunger and said clamp rings to permit removal of the finished ware, and retracting said bottom forming sleeve.

13. In a container manufacturing machine of the character disclosed, an inverted parison mold, a finish mold associated therewith and surrounding the same, a finish sleeve and a finish plunger projecting upwardly into said finish mold, clamp rings for said parison and finish molds having tapered surfaces engageable therewith to hold the molds closed, a bottom forming plunger movable downwardly into said parison mold, said parison mold being openable relative to said finish mold, a ware mold closable relative to said finish mold, one of said clamp rings being also associatable with said ware mold, said ware mold having a tapered surface for engagement therewith, and means for sequentially closing said finish mold around said finish plunger, closing said parison mold about said finish mold, moving said clamp rings onto said parison mold and said finish mold, drawing a vacuum in said parison mold around said finish plunger after a charge of container forming material enters said parison mold, entering said bottom forming plunger into said parison mold and into contact with the charge in said parison mold, drawing a vacuum at said bottom forming plunger, moving said one of said clamp rings out of engagement with said parison mold, opening said parison mold, simultaneously moving said finish plunger and said bottom forming plunger upwardly to stretch the parison and form the interior thereof hollow, closing said ware mold around the parison, moving said one of said clamp rings into engagement therewith, drawing a vacuum in said ware mold surrounding the parison, retracting said finish plunger, introducing expansion medium into the cavity of the parison left thereby to expand the parison to fill said ware mold, releasing the application of vacuum around said finish sleeve, surrounding the parison and at said bottom forming plunger, opening said ware mold, retracting said bottom forming plunger and said clamp rings to permit removal of the finished ware, and retracting said finish sleeve.

14. In a container manufacturing machine, a parison mold, a finish mold associated therewith and surrounding the same, a finish sleeve and a finish plunger projecting upwardly into said finish mold, clamp rings for said parison and finish molds having tapered surfaces engageable therewith to hold the molds closed, a bottom forming plunger movable into said parison mold, said parison mold being openable relative to said finish mold, a ware mold closable relative to said finish mold, one of said clamp rings being movable to surround said ware mold, and means for sequentially closing said finish mold around said finish plunger, closing said parison mold about said finish mold, moving said clamp rings onto said parison mold and said finish mold, drawing a vacuum in said parison mold around said finish plunger after a charge of container forming material enters said parison mold, entering said bottom forming plunger into contact with the charge in said parison mold, drawing a vacuum at said bottom forming plunger, moving said one of said clamp rings out of engagement with said parison mold, opening said parison mold, simultaneously moving said finish plunger and said bottom forming plunger upwardly to stretch the parison and form the interior thereof hollow, closing said ware mold around the parison, moving said one of said clamp rings into engagement therewith, drawing a vacuum in said ware mold surrounding the parison, introducing expansion medium into the parison to expand it to fill said ware mold, releasing the application of vacuum around said finish sleeve, surrounding the parison and at said bottom forming plunger, opening said ware mold, retracting said bottom forming and finish plungers and said clamp rings to permit removal of the finished ware, and retracting said finish sleeve.

References Cited in the file of this patent

UNITED STATES PATENTS

| | | |
|---|---|---|
| 1,107,386 | Voelker | Aug. 18, 1914 |
| 2,063,463 | Rowe | Dec. 8, 1936 |
| 2,154,490 | Burch | Apr. 18, 1939 |
| 2,648,168 | Rowe | Aug. 11, 1953 |